No. 749,794. PATENTED JAN. 19, 1904.
F. R. INMAN.
LATHE CHUCK.
APPLICATION FILED APR. 15, 1903.
NO MODEL. 2 SHEETS—SHEET 1.
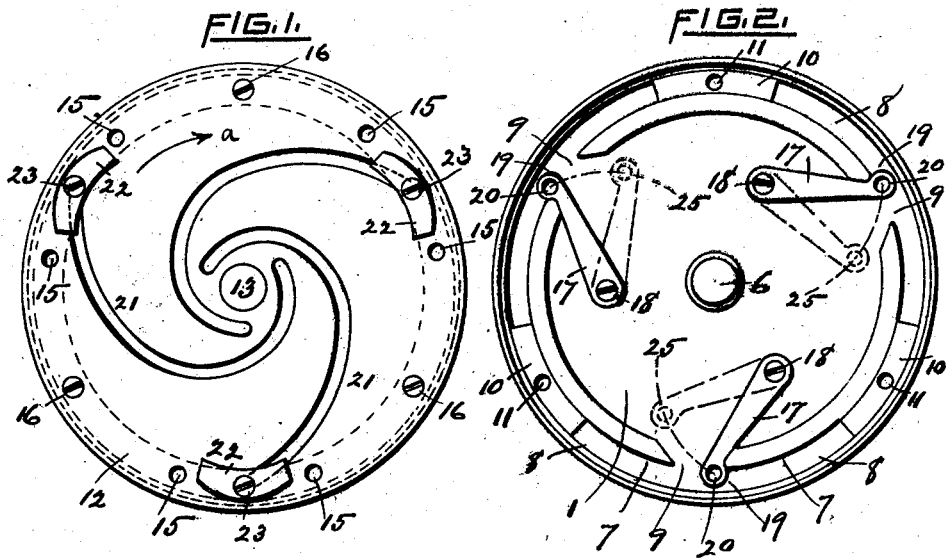
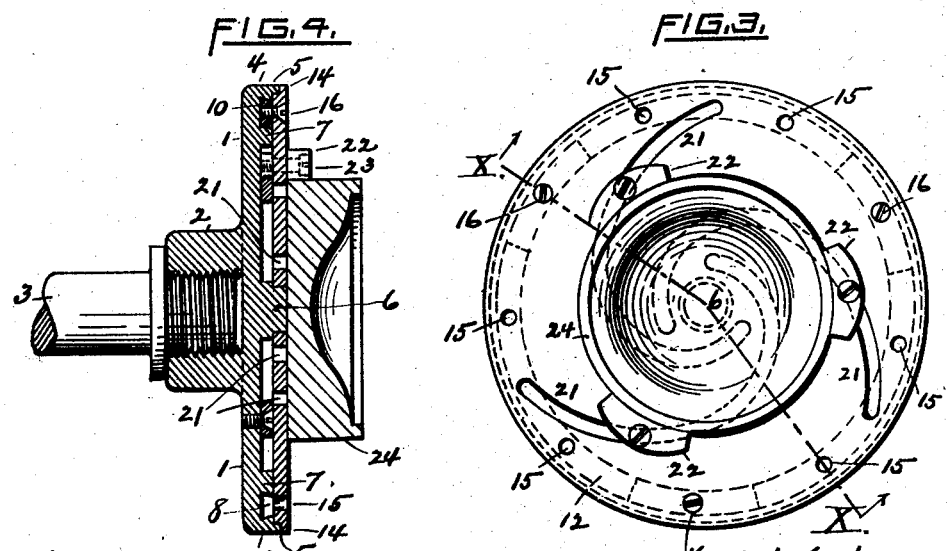
WITNESSES INVENTOR
Charles T. Hannigan Fred R. Inman
Annie E. Pierce By Warren R. Pierce
Attorney No. 749,794. PATENTED JAN. 19, 1904.
F. R. INMAN.
LATHE CHUCK.
APPLICATION FILED APR. 15, 1903.
NO MODEL. 2 SHEETS—SHEET 2.

WITNESSES. INVENTOR.
Charles T. Hannigan. Fred R. Inman
Annie E. Pierce. By Warren R. Perce
Attorney.

No. 749,794. Patented January 19, 1904.

UNITED STATES PATENT OFFICE.

FRED R. INMAN, OF PROVIDENCE, RHODE ISLAND.

LATHE-CHUCK.

SPECIFICATION forming part of Letters Patent No. 749,794, dated January 19, 1904.

Application filed April 15, 1903. Serial No. 152,773. (No model.)

*To all whom it may concern:*

Be it known that I, FRED R. INMAN, a citizen of the United States, residing at Providence, in the county of Providence and State of Rhode Island, have invented certain new and useful Improvements in Lathe-Chucks, of which the following is a specification, reference being had therein to the accompanying drawings.

Like numerals indicate like parts.

Figure 5:
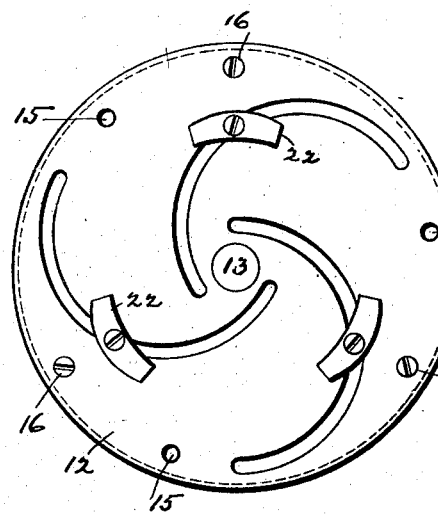
Figure 6:
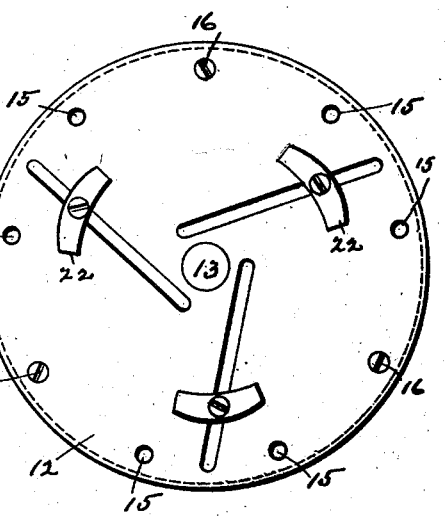
Figure 7:
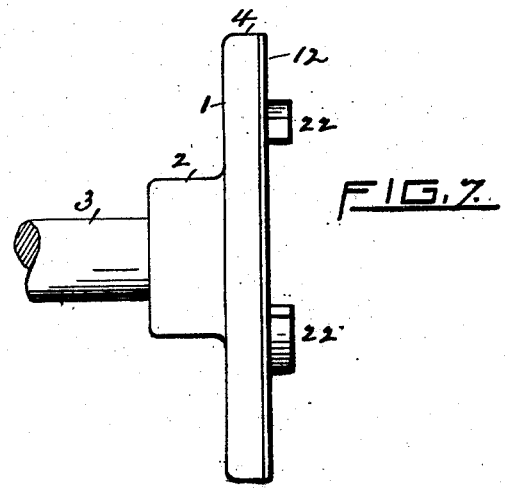

Figure 1 is a plan view of the slatted face-plate of my improved lathe-chuck, together with the work-holders thereon. Fig. 2 is a plan view of the chuck when said face-plate is removed therefrom and illustrates the sliding blocks, the guideways, and the swinging lever-arms for moving the work-holders. Fig. 3 is the same as Fig. 1, except that it shows the piece of wood in position upon the chuck ready to be turned and accurately centered and held in place for the turning operation. Fig. 4 is a view of the same as seen on line *x x* of Fig. 3. Figs. 5 and 6 are plan views of modified forms of the face-plate, showing different arrangements and directions of the slots. Fig. 7 is a side elevation of my invention.

My invention is an improvement in work centering and holding devices for chucks of turning-lathes; and it consists of the novel construction and combination of the several elements, as hereinafter particularly described, and specifically set forth in the claims.

My invention more particularly relates to lathes for wood-turning; and it consists in providing the chucks thereof with adjustable devices for centering and holding the work; but it is also well adapted for high-speed polishing-lathes for finishing metal-work, as will be hereinafter more fully stated.

In the drawings, 1 represents the head of a chuck of a turning-lathe. The hub 2 of said head has a screw-threaded bore and is fastened thereby on the end of the mandrel or shaft 3. The head 1 has an annular flange 4, which itself has an annular flange or extension 5 of less width than that of the flange 4.

The head 1 has on the side opposite the hub 2 and concentric therewith the hub 6 and is also provided with three arc-shaped concentric guides or ribs 7, fixed in position, said hub 6 and guides 7 being preferably integral with the head 1. The inner periphery of the flange 4 and the outer periphery of each of the arc-shaped guides or ribs 7 are undercut or beveled, as seen in Fig. 4. Thus there are formed three arc-shaped dovetail channels 8 between the inner periphery of the annular flange 4 and the guides 7, as shown in Figs. 2 and 4. Between the several guides 7 are openings or spaces 9. The ends of said guides 7 are beveled transversely, as illustrated in Fig. 2.

In each channel 8 there is a sliding block 10 of a width to fit in loose contact with the inner periphery of the flange 4 and the adjacent guide or rib 7, as seen in Fig. 2. Each sliding block 10 has its longitudinal sides beveled, so that it is in the shape of a truncated wedge. Each block 10 is of a length exceeding that of the intermediate space 9, which is between the ends of the guides 7. In the center of each sliding block 10 a screw-threaded hole 11 is made.

A circular face-plate or disk 12 has a central circular hole 13, by which it is rotatably mounted on the hub 6. The hub 6 is concentrically reduced in diameter, so that the face-plate 12 rests upon the shoulder so formed and is in contact with the face of each guide 7, as shown in Fig. 4. Said plate 12 has an annular extension or flange 14, which fits over the edge of the flange or extension 5 of the head 1, as seen in Fig. 4. It has at proper intervals spanner-holes 15 and also reamed holes, in which are seated screws 16, which, passing through the face-place 12, enter and engage the screw-threaded holes 11 of the sliding blocks 10.

Lever-arms 17 are pivotally mounted at one end thereof, respectively, on screws 18, which enter screw-holes tapped in the head 1 of the chuck. Each lever-arm 17 has at its opposite end a rounded head 19, with a round hole 20 through it transversely. The free or headed ends of the lever-arms 17 oscillate into and out of the spaces 9 between the ends of the guides 7, as illustrated in Fig. 2.

The face-plate 12 has three slots 21, preferably spiral, as shown in Fig. 1, the outer ends of which are near to the circumference of the face-plate, the inner ends of which converge near the central circular aperture 13, but eccentrically thereto.

The holders or dogs 22 are secured by screws 23 to the heads 19 of the lever-arms 17, respectively, said screws engaging with the threaded holes 20 in said heads 19. The holes which extend through said holders 22 are reamed at the outer ends thereof, so that the heads of the screws 23 are flush with the outer surface of said holders. The holders 22 freely turn on the unthreaded portion or shank of the screws 23. The holders 22 have their work-holding edges all on the same curvature, and their ends are cut off on the radial lines of such curvature, so that when the holders 22 are at their innermost positions they together have their work-holding edges in a true and complete circle.

The shanks of the screws 23 are of such a diameter as to fit loosely in the slots 21 of the face-plate 12.

The wooden block or work, which is centered and held upon the chuck to be operated upon, is designated as 24 and is shown in position in Figs. 3 and 4.

Having thus described the parts of said device, I will now explain the manner of its operation.

The screws 16 are sufficiently loosened to allow the face-plate 12 to be turned. The holders 22 are at or near the position indicated in Fig. 1 at the outer ends of the slots 21, respectively. A spanner or other suitable tool is used to rotate the face-plate 12 and may be inserted in the holes 15 for that purpose. The wooden block 24 is placed and held temporarily by hand at or near the center of the face-plate 12 in contact therewith, and the spanner or tool is then used to partially rotate in the direction indicated by the arrow $a$ the face-plate 12 on the hub 6 of the head 1. The edges of the slots act as cam-surfaces, and as the face-plate 12 is partially rotated in the direction of the arrow $a$ they cause the screws 23 to follow inwardly the courses of the slots 21, and thereby the lever-arms 17 are oscillated on their pivots 18, as indicated by the dotted lines in Fig. 2, and the heads 19 of said levers move in the arcs designated by dotted lines 25 in said figure. The three holders 22, swiveling freely on the screws 23, thus move inwardly at the same rate of speed toward the center, and when they come in contact with the periphery of the block 24 they automatically fit their concave edges upon said block, and thus accurately center said block, as illustrated in Figs. 3 and 4. The screws 16 are then tightened up and serve as clamps to hold the face-plate 12 firmly to the head 1 and to maintain the grip of the holders 22 on the block 24, the beveled surfaces of the sliding blocks 10 being drawn up into forcible contact with the beveled sides of the channel 8. While the face-plate 12 is thus partially rotating the blocks 10, to which the plate or disk 12 is connected by the screws 16, slide in but cannot leave the arc-shaped channels 8, Fig. 2, the screws 16 having been slightly loosened, as already stated; but when the block 24 has been centered and the screws 16 have been tightened by hand all the parts are held securely and rigidly in place.

In Figs. 5 and 6 are shown modifications of the face-plate 12, consisting of the employment of arc-shaped slots or straight slots instead of spirally-directed slots 21, as in Fig. 1. The mechanical principle involved is the same; but the gripping power of the holders 22 is greater in the case of the spiral slots 21 than in case of the otherwise-directed slots. The straight slots being shorter in extent than the others allow quicker action, though they have less holding power, whereas curved slots, whether arc-shaped or spiral, though slightly less quick in action, have greater binding power. Instead of mounting the face-plate 12 on the hub 6 of the head 1 by means of the circular central aperture 13, as shown, it is obvious that a screw, pivot, or other equivalent device may be used for the same purpose. It is seen in Fig. 4 that the face-plate is so flanged that it is capable of a rotary movement within the annular flange 5 of the head. Therefore the hub 6 may be dispensed with, if desired, or if the hub 6 is used for the mounting of the face-plate 12 the flange 14 of the face-plate 12 may be dispensed with. I prefer, however, to use both the hub 6 and the flange 14, as illustrated in Fig. 4.

It is preferred to use a plate or disk having three slots, and consequently to have three lever-arms and three holders; but any other suitable number of these may be used as may be found advantageous.

So far as I am aware a wood lathe-chuck has never heretofore been provided with any adjustable device either for centering the material thereon which is to be turned or for holding the same in position during operation. A common device used for these purposes has been a face-plate having a central socket into which the end of the wooden block or piece having first been cut down to a proper size has been inserted and held tight by driving. A more common method is to provide a wooden disk on the outside of the face-plate and to fasten said disk in position by screws which extend through the face-plate into said disk, in the rear thereof, which wooden disk is made with a work-holding socket turned therein. It is evident that such methods are crude and inaccurate. By my device the work is automatically centered with the utmost accuracy. Moreover, the same is so firmly held in position as to be acted on perfectly by the cutting-tool however rapid may be the speed of the rotation. For lack of suitable work-holding means it has been practically impossible to use chucks at high speeds in operating wood-turning lathes. My invention enables the operation of such lathes at high rates of speed, which have hitherto been unattainable on work of large diameters.

For polishing metallic work my improved lathe-chuck is well adapted. While it is not desirable that chucks for metal-turning should be operated at high speed, because the hardness of the material necessitates a slow movement of rotation, yet for polishing turned metallic work as the resistance is very slight great speed is very desirable and conducive to fineness of finish. This has not been heretofore possible in the use of metal-holding chucks, for they are necessarily massive and heavy to adapt them to their work, and hence they cannot endure the centrifugal strain of very rapid revolutions, and besides as the work-centering and work-holding devices on metal-holding chucks are not geometrically disposed such chucks are not balanced and if driven at high speed are subject to great vibration, the effects of which are injurious to the work.

My improved chuck has but few parts, is very simple in construction, and is comparatively thin. All the parts are geometrically disposed so that the chuck is perfectly balanced and runs true without any vibration. It dispenses with all the gearing and other parts, which in metal-working lathes are required for centering and holding the work, and is consequently light and capable of very rapid action.

I claim as a novel and useful invention and desire to secure by Letters Patent—

1. The improved work-centering mechanism for turning-lathes herein described, consisting of the combination of a head provided with a central hub, a plurality of lever-arms pivotally mounted at their inner ends to said head, a face-plate mounted centrally and rotatably upon said hub and having as many slots converging toward the center but eccentrically therewith as there are lever-arms, and a work-holding jaw pivotally mounted exterior to said face-plate upon the outer end of each of said lever-arms by a screw which passes through the adjacent slot in the face-plate, substantially as shown and for the purpose specified.

2. In a machine of the class described, the combination of a peripherally-flanged head having on its inner surface near its edge a concentric annular rib with three equispaced openings therein for receiving the movable ends of the lever-arms hereinafter named and also provided with a central hub, three sliding blocks movable in the three segmental channels so formed, three lever-arms pivotally mounted on said surface of the head at their inner ends and so located that their outer ends are movable into and out of said openings of the annular rib, respectively, a face-plate mounted centrally and rotatably upon said hub and having three slots converging inwardly to equispaced points, respectively, which are equally distant from the geometrical center of said face-plate, three work-holding jaws exterior to said face-plate connected to and carried by said lever-arms, respectively, by means of screws which respectively pass through said work-holding jaw and through said respective slots into the lever-arms adjacent to said holders and three clamping-screws passing through said face-plate into said sliding blocks, respectively, substantially as shown and for the purpose specified.

In testimony whereof I affix my signature in presence of two witnesses.

FRED R. INMAN.

Witnesses:
WARREN R. PERCE,
MABEL FOSTER.